United States Patent Office 3,031,478
Patented Apr. 24, 1962

3,031,478
PROCESS FOR THE PRODUCTION OF NATURAL PHOSPHOLIPIDS AND SUBSTANCES PRODUCED THEREBY
Ernst Klenk, 3 Goebenstrasse, Hildegard Debuch, 82 Siebengebirgsallee, Hans Eikermann, 60 Wiethasestrasse, and Gertrud Lappe, née Reuter, 113 Bachemerstrasse, all of Koln, Germany
No Drawing. Filed May 5, 1960, Ser. No. 26,954
6 Claims. (Cl. 260—403)

The present invention refers to a process for the production of natural phospholipids obtained from vegetable crude phosphatides, particularly such which are produced in a known manner out of such sources as soya beans, and to substances produced thereby.

The present application is a continuation-in-part of our co-pending patent application, Ser. No. 694,524, filed November 5, 1957.

The choline and colamine phosphoric acid diglyceride esters belong to crude ester phosphatides which are widely distributed throughout the animal and plant kingdoms. These esters appear as compounds, particularly in the crude phosphatides of vegetable origin. A mixture of crude phosphatides is designated generally in trade and industry as lecithin.

However, while according to chemical nomenclature all substances containing choline are classified as lecithins, those which are characterized by a weaker basic group of $\beta$-amino-ethyl alcohol are generally known as cephalins.

Cephalin (colamine phosphoric acid diglyceride ester) is identified by the following structural formula:

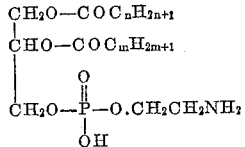

where $n$ is = 15 or 17 and $m$=17.

Lecithin (choline phosphoric acid diglyceride ester) is identified by the following structural formula:

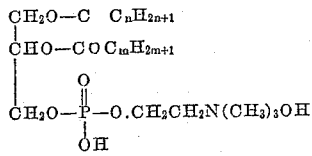

where $n$ is = 15 or 17 and $m$=17.

On hydrolysis lecithin yields fatty acids, glycerol, phosphoric acid and choline. There are, therefore, different lecithins depending on the character of the fatty acid radicals. Each lecithin contains unsaturated and saturated fatty acids. The saturated fatty acids were found to be e.g. palmitic and stearic, and the unsaturated fatty acids consist as we have found, to a great extent of so called essential fatty acids.

It is understood that in medical science at present the essential fatty acids are considered to be generally those fatty acids important to life and which the human body can not itself synthesize. These essential fatty acids are of a specific configuration, of which linoleic acid is of basic significance in the human organism, since it produces in the human body a very active esential fatty acid known as arachidonic acid, whose empirical formula is $C_{20}H_{32}O_2$ and whose chemical name is 5,8,11,14-eicosatetraenoic acid.

The essential fatty acid possess a considerable degree of importance for the human organism. In the numerous studies and investigations conducted by medical researchers, the following facts have been uncovered:

In numerous animal experiments it had been found that during a non-fatty diet a small amount of linoleic acid is sufficient to synthesize arachidonic acid in the body.

In acute parenchyma it has been found that the length of sickness is shortened considerably by feeding essential fatty acids. Also in a chronic heptatopathic condition, a distinct increased degree of success was evident with the same treatment. Essential unsaturated fatty acids, however, have also shown not only a lipotropic action, but a favourable influence upon glycogen synthesis as well.

It is an object, therefore, of the present invention to produce natural phospholipids rich in essential fatty acids from crude phosphatides of vegetable origin, especially from soya beans containing crude phosphatides.

It is another object of the present invention to produce from crude phosphatides of vegetable origin, especially from soya beans containing crude phosphatides, phospholipids wherein choline esters of diglyceride phosphoric acid predominate, or which consist entirely thereof, and which are rich in unsaturated and essential fatty acids.

A further object of the present invention is to produce a substantially chemically pure choline ester of diglyceride phosphoric acid from crude phosphatides of vegetable origin especially from soya beans containing crude phosphatides in such manner, that the essential fatty acids contained in a natural condition in the phosphatide esters are retained, while other substances, including all phosphatide esters which do not have choline as their basic component, are removed to a great extent.

Another object is to produce a phospholipid with a high content of essential fatty acids, which consist practically exclusively of choline esters of diglyceride phosphoric acid and may be designated as chemically pure and suitable to be intravenously injected.

Yet a further object of the present invention is to provide a novel product which is obtained in accordance with the novel methods herein described and which is of therapeutic and medical value.

It is an additional object to provide a novel product which may be intravenously injected and which is produced in accordance with the novel process herein described.

Other objects of the present invention will become apparent during the course of the following specification.

In the attainment of the aforesaid objective, the inventive concept of the present invention may be realized through a method of producing a chemically pure choline ester of diglyceride phosphoric acid exclusively from crude phosphatides of vegetable origin, especially from soya beans containing crude phosphatides which have a high content of essential fatty acids. The inventive concept of the present invention further includes the feature that choline phosphoric acid diglyceride esters produced according to the method of this invention may be split off enzymatically with snake venom which attacks and splits off fatty acids in their alpha position, so that monoglyceride phosphoric acid choline esters (lysolecithin)

are produced, which in the beta position contain a surprisingly high content of essential fatty acids. Monoglyceride phosphoric acid choline esters are highly efficient biologically through the provision of an unusually large external surface activity. They have been found to be capable of being used successfuly both physiologically for assimilation purposes and medically as heart stimulants. The choline ester of the monoglyceride phosphoric acid is water soluble as distinguished from the choline ester of diglyceride phosphoric acid, but is insoluble in ether and acetone.

It is known that the ester of diglyceride phosphoric acid may be extracted from crude phosphatides, particularly from soya beans containing crude phosphatides, firstly by extracting crude phosphatides by means of acetone and then processing with alcohol the ester mixture resulting from this extraction.

The objects of the present invention are realized, however, by subjecting an extraction residues of vegetable crude phosphatides, such as crude soya bean phosphatides, which has been freed from acetone in vacuum and in the presence of an inert gas, to a repeated extraction with alcohol; the alcoholic solutions are allowed to stand for several days, are then freed from suspended or colloidal particles, which had been also dissolved, and are finally concentrated in vacuum while passing an inert gas. In this manner, phospholipids are obtained in satisfying amounts, which contain choline predominantly as the basic component and which have substantially 60% essential fatty acids in relation to the total fatty acid content.

All steps, the extraction with acetone and alcohol are carried out at a temperature not exceeding 35° C. and preferably with the exclusion of light.

It should be noted in this connection that the alcoholic solutions resulting from the extraction are turbid since they contain particles which are suspended or colloidally dissolved therein. These alcoholic solutions can not be purified by filtration, since the particles pass through the filter. However, when the alcoholic solutions are allowed to stand for several days, the particles aggregate and then they can be separated from the alcoholic solution by decanting or filtration.

The feature that the solutions are allowed to stand for several days is of substantial technical importance. The alcoholic extract contains not only choline phosphoric acid diglyceride ester, but also colamine phosphoric acid diglyceride fatty acid ester (cephalin). Although, as is known, cephalin is dissolved in alcohol with difficulty, the solubility increases in the presence of choline phosphoric acid diglyceride fatty acid ester. If, however, the alcoholic extract is allowed to stand for several days, then cephalin and other substances are separated, so that they can be conveniently removed from the alcoholic extract by decanting or filtration. The separation of cephalin and other substances, which is produced in this manner, is of substantial importance since it was found that essential fatty acids are bound predominantly with the choline phosphoric acid diglyceride part and not with the colamine phosphoric acid diglyceride part. Thus according to the present invention natural choline phosphoric acid diglyceride esters are produced which have less colamine phosphoric acid diglyceride fatty acid esters than would have been the case if the alcoholic extract were not allowed to stand for several days.

According to a further feature of the process of the present invention, in order to complete the separation of colamine phosphoric acid diglyceride ester, the alcoholic solution is passed at a temperature not exceeding 35° C. with the exclusion of light air, that is oxygen, in the presence of an inert gas, such as nitrogen, through an absorption column containing an alcoholic slurry of carbonates and/or oxides of one or more elements taken from the second and third groups of the periodic table, preferably aluminum and/or magnesium and/or silicon. For the purpose of the present invention, aluminum oxide has been found to be especially useful. Upon evaporation of the alcoholic eluate by distillation under vacuum at a temperature of at most 35° C. in the presence of an inert gas, a chemically pure choline ester of diglyceride phosphoric acid is obtained. This product has been found to be particularly suitable for intravenous administration and contains a surprisingly high content of unsaturated and essential fatty acids.

In order to increase the output of choline phosphoric acid diglyceride esters, the compounds formed in the column from the respective oxides and/or carbonates of the aforenamed elements and choline and colamine phosphoric acid diglyceride esters, must be split off by eluting with alcohol which takes place at a temperature of at most 35° C. in the presence of an inert gas. The eluate leaving the column and obtained by eluting with alcohol may be combined with the first eluate fraction and both solutions simultaneously concentrated under vacuum again at a temperature of at most 35° C. in the presence of an inert gas, such as nitrogen.

All steps, the extraction, the eluation and the evaporation are preferably carried out under the exclusion of light.

The resulting choline ester of diglyceride phosphoric acid is a colorless substance of paste-like consistency which is easily soluble in ether, chloroform, alcohol, petroleum ether and other organic solvents. In acetone it is completely insoluble. The total nitrogen value is theoretically calculated at 2.05%. According to a Kjeldahl determination, the choline nitrogen value is calculated at 2.04%; consequently, over 99.5%, or practically 100%, of the total nitrogen consists of choline nitrogen. The fatty acids of the esters produced in accordance with the present invention, calculated as total fatty acids present as ester constituents, are constituted of 17.7% saturated and 82.3% unsaturated fatty acids. The absolute values solely for the unsaturated fatty acids are as follows:

In the 82.3% content of unsaturated fatty acids, the oleic acid content is 17.2%, the linoleic acid content is 52%, and the linolenic acid content is 13.1%. These absolute values when calculated in relative terms based upon unsaturated fatty acids amount to approximately 20% for oleic acid, 64% for linoleic acid, and 16% for linolenic acid. Based on the essential fatty acids alone, the linoleic acid fraction amounts to 80% and the linolenic acid fraction amounts to 20%, due to the process of the present invention.

It is thus apparent that the process of the present invention is based on a fractional extraction which is carried out in three stages. In the first stage, choline phosphoric acid diglyceride ester (lecithin) is precipitated, which is poor in colamine phosphoric acid diglyceride ester (cephalin).

In prior art it was not possible to produce such lecithin which contains substantially 60% essential fatty acids in relation to the total fatty acids.

In the second stage a chemically pure lecithin is produced which contains 66-70% essential fatty acids in relation to the total fatty acids.

In the third stage a choline ester of monoglyceride phosphoric acid is obtained, which has 28% of essential fatty acids in relation to the total fatty acids.

While in prior art it was known to transform lecithin into lysolecithin by hydrolysis, the process of the present invention has the most surprising effect of producing a choline ester of monoglyceride phosphoric acid which has a high content of unsaturated and essential fatty acids.

*Example*

8 kilograms of crude phosphatides from soya beans are freed from oily constituent parts by repeated extraction with approximately 150 liters of acetone in the presence of nitrogen at a temperature not exceeding 35° C. while excluding the presence of air and oxygen respectively. The residue is vacuum distilled and freed of acetone in the presence of an inert gas, whereupon a repeated extraction of the remaining residue is effected with ethanol. This extraction is performed with the exclusion of light, air and oxygen, respectively and again at a maximum temperature of 35° C., in that an inert gas, such as nitrogen, is passed through the extraction installation. The alcoholic solutions are clarified by standing for several days from suspended and colloidal particles respectively which aggregate; the solutions are then decanted and the alcohol is distilled off under vacuum in the presence of an inert gas, such as nitrogen or carbon dioxide, a phospholipid product is obtained in approximately 25–30% yield, which in relation to the total fatty acid content has 60% essential fatty acids, corresponding to a molecular proportion of about 45%.

1 liter of an alcoholic solution of the phospholipid product obtained in approximately 2–3% concentration is passed through an absorption column of 4 cm. cross-section within a period of 10 hours with the exclusion of light, air, oxygen, respectively, the absorption column containing a flotation having, for example, a 10% suspension of magnesium oxide and aluminum oxide in ethanol. After the initial alcoholic eluate has passed through the column, the column is again eluted with 3 liters of ethanol. The alcoholic eluate solutions are then combined and the alcohol is distilled off under vacuum in the presence of an inert gas. 10–14 grams of chemically pure, i.e. cephalin free, choline ester of diglyceride phosphoric acid are produced containing in relation to the total fatty acids substantially 66–70% essential fatty acids.

5.7 grams of the cephalin free choline ester of diglyceride phosphoric acid are dissolved in 570 cubic centimeters of peroxide-free ether to which is added 6 cubic centimeters of an aqueous solution containing 18 mg. of snake venom (*Crotalus adamanteus*) or bee venom. The solution, after frequent shaking, is allowed to stand for a period of 24 hours at room temperature. The fatty acids which are split off remain dissolved in the solvent medium whereas the monoglyceride phosphoric acid choline ester (lysolecithin) which is insoluble in ether, precipitates. The solvent medium and the lysolecithin are separated by means of a centrifuge; the residual solvent is distilled off under vacuum. 2.9 grams of choline ester of the monoglyceride phosphoric acid are obtained, which contain 28% essential unsaturated fatty acids, the calculation being based upon the total fatty acids.

It is to be understood that the present invention is not restricted to any of the specific proportions, procedures, or ingredients described hereinabove but includes all variations, modifications and equivalents as fall within the scope of the appended claims.

What we claim is:

1. A process for the production of natural phospholipids out of vegetable crude phosphatides, particularly soya bean crude lecithin, comprising the steps of extracting the crude lecithin with acetone to remove oil and leave a residual ester mixture, then extracting the residual ester mixture with alcohol, storing the alcoholic solution for several days to clarify the solution from suspended colloidal particles, decanting the alcoholic solution containing a choline ester of diglyceride phosphoric acid predominantly as the basic component and distilling the alcohol under vacuum while simultaneously passing an inert gas, all steps being carried out in the presence of an inert gas at a temperature of at most 35° C. while excluding the presence of oxygen and light.

2. A process for the production of natural phospholipids out of vegetable crude phosphatides, particularly soya bean crude lecithin, comprising the steps of extracting the crude lecithin with acetone to remove oil and leave a residual ester mixture, then extracting the residual ester mixture with alcohol, storing the alcoholic solution for several days to clarify the solution from suspended colloidal particles, decanting the alcoholic solution containing a choline ester of diglyceride phosphoric acid predominantly as the basic component, diluting the alcoholic solution to a content of approximately 2–3% of said ester by adding alcohol, passing the solution through a column containing an alcoholic slurry of substances selected from the group consisting of oxides and carbonates of aluminum, magnesium and silicon, eluting the slurry with alcohol, and concentrating the resulting alcoholic eluate containing a substantially chemically pure choline ester of diglyceride phosphoric acid, under vacuum in the presence of an inert gas, all steps being carried out in the presence of an inert gas, at a temperature of at most 35° C. while excluding the presence of air, that is oxygen, and of light.

3. A process in accordance with claim 2, comprising the additional steps of reacting the choline ester of diglyceride phosphoric acid with an enzyme selected from the group of snake venom and bee venom in a solvent medium, separating the solvent medium by means of a centrifuge and distilling the residual solvent medium from the choline ester of monoglyceride phosphoric acid.

4. A natural phospholipid, consisting essentially of the product obtained by extracting crude lecithin with acetone from vegetable crude phosphatide, particularly soya bean crude lecithin to remove oil and leave a residual ester mixture, then extracting the residual ester mixture with alcohol, storing the alcoholic solution for several days to clarify the solution from suspended colloidal particles, decanting the alcoholic solution containing a choline ester of diglyceride phosphoric acid predominately as the basic component and distilling the alcohol under vacuum while simultaneously passing an inert gas, all steps being carried out in the presence of an inert gas at a temperature of at most 35° C. while excluding the presence of oxygen and light.

5. A natural phospholipid, consisting essentially of the product obtained by extracting crude lecithin with acetone from vegetable crude phosphatide, particularly soya bean crude lecithin to remove oil and leave a residual ester mixture, then extracting the residual ester mixture with alcohol, storing the alcoholic solution for several days to clarify the solution from suspended colloidal particles, decanting the alcoholic solution containing a choline ester of diglyceride phosphoric acid predominately as the basic component, diluting the the alcoholic solution to a content of approximately 2–3% of said ester by adding alcohol, passing the solution through a column containing an alcoholic slurry of substances selected from the group consisting of oxides and carbonates of aluminum, magnesium and silicon, eluting the slurry with alcohol, and concentrating the resulting alcoholic eluate containing a substantially chemically pure choline ester of diglyceride phosphoric acid, under vacuum in the presence of an inert gas, all steps being carried out in the presence of an inert gas, at a temperature of at most 35° C. while excluding the presence of air, that is oxygen, and of light.

6. A natural phospholipid, consisting essentially of the product obtained by extracting crude lecithin with acetone from vegetable crude phosphatide, particularly soya bean crude lecithin to remove oil and leave a residual ester mixture, then extracting the residual ester mixture with alcohol, storing the alcoholic solution for several days to clarify the solution from suspended colloidal particles, decanting the alcoholic solution containing a choline ester of diglyceride phosphoric acid predominately as the basic component, diluting the alcoholic solution to a content of approximately 2–3% of said ester by adding alcohol, passing the solution through a column containing an alcoholic slurry of substances selected from the group consisting of oxides and carbonates of aluminum, magnesium and silicon, eluting the slurry with alcohol, and concentrating the resulting alcoholic eluate containing a substantially chemically pure choline ester of diglyceride phosphoric acid, under vacuum in the presence of an inert gas, all steps being carried out in the presence of an inert gas, at a temperature of at most 35° C. while excluding the presence of air, that is oxygen, and of light, and thereupon reacting the choline ester of diglyceride phosphoric acid with an enzyme selected from the group of snake venom and bee venom in a solvent medium, separating the solvent medium by means of a centrifuge and distilling the residual solvent medium from the choline ester of monoglyceride phosphoric acid.

References Cited in the file of this patent

UNITED STATES PATENTS 2,013,804    Klein _____ Sept. 10, 1935

OTHER REFERENCES

Wittkoff: The Phosphatides, pages 105–106 (1951), A.C.S. Monograph No. 112, Reinhold Publishing Company, 330 West 42nd Street, New York, N.Y.